United States Patent [19]
Nagayama

[11] 3,829,951
[45] Aug. 20, 1974

[54] WIRE STRIPPER
[75] Inventor: Kazuo Nagayama, Yokohama, Japan
[73] Assignee: Seiken Kogyo Kabushiki-Kaisha, Kawasaki, Japan
[22] Filed: Aug. 2, 1973
[21] Appl. No.: 385,574

[30] Foreign Application Priority Data
Nov. 13, 1972 Japan.............................. 47-112946

[52] U.S. Cl. ........................................... 29/203 DT
[51] Int. Cl............................................. H01r 43/04
[58] Field of Search... 29/203 DT, 203 H, 203 DTS, 29/203 D, 203 B

[56] References Cited
UNITED STATES PATENTS
3,122,826   3/1964   Self................................ 29/203 DT
3,378,906   4/1968   Dorsey............................ 29/203 H Primary Examiner—Thomas H. Eager
Attorney, Agent, or Firm—Spensley, Horn & Lubitz

[57] ABSTRACT

A device for stripping a covered wire and wrapping the uncovered wire on a terminal. The device includes a spindle rotatably mounted in a sleeve which is adapted to attach at an end thereof to a suitable power tool. The spindle is driven by the output shaft of the power tool and has a bore for receiving the terminal and an axially extending groove for receiving an end portion of the covered wire. The spindle also has a knife edge at the open end of the groove. When the spindle is driven to rotate about the terminal, the wire is stripped of its cover and is wound on the terminal.

3 Claims, 5 Drawing Figures

PATENTED AUG 20 1974
3,829,951
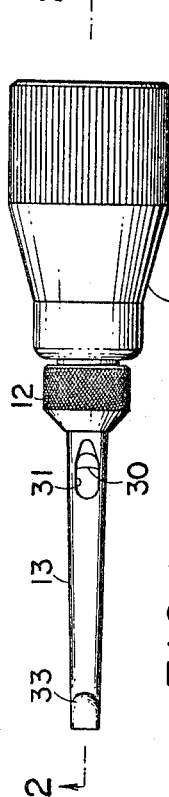
FIG.1
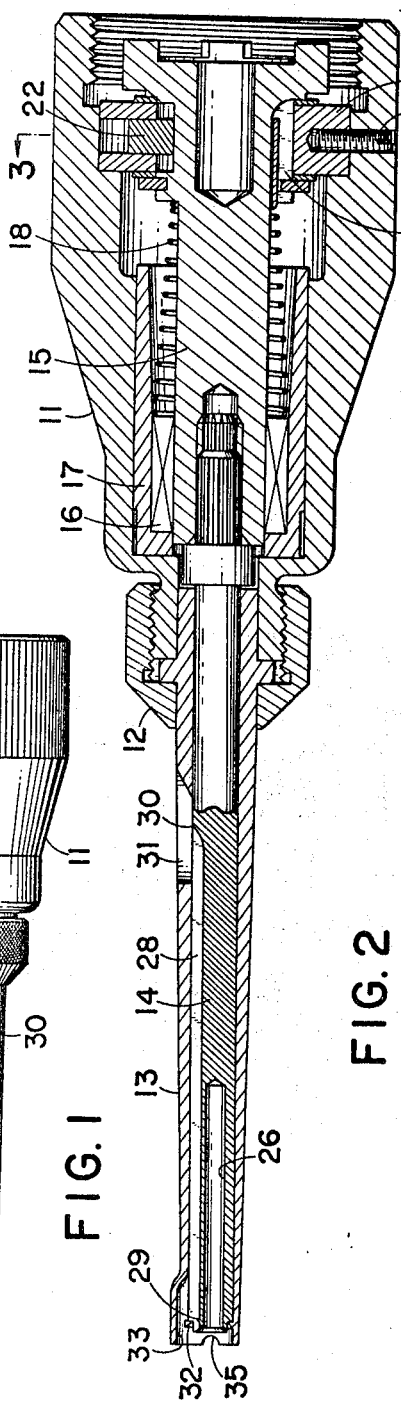
FIG.2
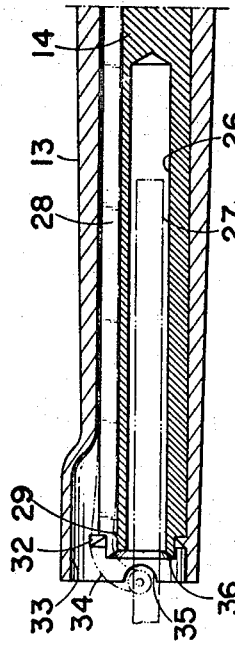
FIG.3
FIG.4
FIG.5

WIRE STRIPPER

BACKGROUND OF THE INVENTION

1. Field of the Invention

This invention relates to a device for automatically stripping the cover of a covered wire and wrapping the uncovered wire on a terminal.

2. Prior Art

When a covered wire is used to connect to a terminal, there needs two operations; first to remove the cover and second to connect the uncovered wire to the terminal. The first operation is conventionally carried out by using a relatively large-sized stripping machine. A covered wire is cut into lengths of wire which are to be fed to the stripping machine for removing the respective covers to a predetermined extent from an end of each wire. Then a wrapping tool is used to connect the partially stripped wires to the respective terminals.

The present invention is to provide an improved device which can perform the above two operations by one tool.

BRIEF DESCRIPTION OF THE INVENTION

The present invention device is embodied by rotatably mounting a spindle in a sleeve which has at an end thereof means for securing to a suitable power tool. The spindle is connected at an end thereof with the output shaft of the power tool. The spindle has at the other end a bore for loosely receiving a terminal and also has an axially extending groove on the outer wall surface thereof. A knife edge is formed at the open side of the groove of the spindle. The covered wire which is to be connected to the terminal, is inserted into the groove on the spindle. When the spindle is driven to rotate, the wire is rotated together with the spindle and is coiled on the terminal. At the same time, the cover of the wire is cut by knife edges formed on the spindle and the sleeve. Thus, the wire is drawn out of the groove leaving its cover in the groove on the spindle. The coiling of the uncovered wire on the terminal is so strong that it needs no soldering for establishing a satisfactory electrical connection between the wire and the terminal.

BRIEF DESCRIPTION OF THE DRAWING

FIG. 1 is a plan view of the device embodying the invention;

FIG. 2 is an enlarged sectional view of the device taken along the line 2—2 of FIG. 1;

FIG. 3 is a section on the line 3—3 of FIG. 2;

FIG. 4 is a further enlarged sectional view of a portion of the device of FIG. 2; and FIG. 5 is an end view of FIG. 4.

DESCRIPTION OF THE PREFERRED EMBODIMENT

Turning now to the drawing, there is shown in FIG. 1 a device generally indicated by the reference numeral 10 and having a body 11 for mounting on a suitable electric tool (not shown) by screw engagement. Fixedly but removably secured to the body 11 by a cap nut 12 is a sleeve 13. The body 11 and the sleeve 13 are pierced by a spindle 14 which is fixedly secured at an end thereof to a clutch element 15 for engagement with the corresponding clutch element (not shown) provided on the output shaft of the electric tool. The clutch element 15 as well as the spindle 14 is borne by a needle bearing 16. Disposed between the bearing 16 and the inner wall surface of the body 11 is a bushing 17. A conically-coiled spring 18 rests at the larger-diameter end thereof on a side of the bearing 16, the other end of which spring being engaged with the clutch element 15 at 19. The spring 18 is arranged to produce a torsional moment to rotate the clutch element 15 in the direction opposite to the rotation of the output shaft of the power tool. A ring member 20 is fixedly mounted in the body 11 by a pin 21. The ring member 20 has a chamber for pivotally mounting therein a pawl 22 at 23, which pawl is biased by a compression spring 24 so as to engage its tip end with a notch 25 formed on the clutch element 15 when the clutch element is rotated by the action of torsion spring 18 in a counter clockwise direction in FIG. 3.

At the forward end portion of the spindle 14, a bore 26 is formed with the dimensions for loosely receiving a terminal 27. An axially extending groove 28 is formed on the spindle 14, the outer end of the groove being defined by a knife edge 29 and the bottom of the groove at the inner end thereof being gradually raised until it reaches the periphery of the spindle 14 at 30.

The sleeve 13 rotatably receives the spindle 14 and has a slot opening 31 which suitably extends from a position disclosing the inner end 30 of the groove 28 of the spindle 14 toward the forward end of the sleeve as shown. At the forward end portion of the sleeve 13, a radially inwardly projecting knife edge 32 is formed on the inner wall surface of the sleeve, which knife edge being mated with the knife edge 29 of the spindle 14 as shown especially in FIG. 4. As shown in FIG. 5, the annular knife edge 32 is cut off at a portion which is on the line of extension of the slot opening 31. At the same time, this portion of the sleeve 13 is buldged its wall at 33 as especially shown in FIGS. 4 and 5. Thus, there is formed a space ready to insert a covered wire 34 when the buldged wall 33 is aligned to the groove 28 of spindle 14. The heights of the knife edges 29 and 32 are made to take the dimensions not exceeding half the thickness of the cover of wire 34.

As illustrated in FIG. 5, the center of the bore 26 of spindle 14 is preferably biased from the center of rotation of the spindle in order to minimize the outer lateral dimension of the device. This eccentric arrangement of the groove 28 with respect to the bore 26 is also effective to increase the binding force of the wire on the terminal.

The sleeve 13 has at the forward end thereof a pair of diametrically opposed semicircular notches 35.

In operation, the groove 28 of spindle 14 is aligned with the buldged portion 33 of sleeve 13. This is accomplished by the engagement of the pawl 22 of ring member 20 with the notch 25 of clutch element 15 by the force of spring 18. Then the wire 34 which is to be stripped its cover and to be coiled on the terminal 27, is inserted into the groove 28 of spindle 14 until the free end of the wire is observed through the slot opening 31 of sleeve 13. When an extra length of wire is inserted into the groove 28, its free end will project from the inner end 30 of the groove into the slot opening 31. But, when the spindle 14 is driven to rotate, the projected portion of the wire will be sheared by the mating edges of the slot opening 31 and the groove 28. Thus, the position of the inner end 30 of groove 28 will determine the length of wire to be stripped.

When the spindle 14 is driven to rotate in a counter clockwise direction in FIG. 5, the wire 34 in the groove 28 will be rotated together with the rotation of the groove about the terminal 27 positioned in the bore 26 of spindle 14. During the driving rotation of the spindle 14, the coiled spring 18 is also rotated in a direction for decreasing the diameter of the coil. Thus, the frictional engagement between the coiled spring 18 and the bushing 17 little interferes with the drive of the spindle. As the spindle 14 starts to rotate, the wire 34 is brought into engagement with the knife edges 29 and 32, resulting in giving cut to the cover of the wire. As the continuation of rotation of the spindle 14, the wire is withdrawn from the groove 28 leaving its cover in the groove. Thus the uncovered wire will be coiled on the terminal 27. The residual cover of wire will be driven out of the groove 28 through the slot opening 31 by the insertion of the covered wire for next stripping and wrapping on next terminal. Upon the completion of wrapping of the uncovered wire on the terminal, a suitable switch is operated to stop the drive of the output shaft of the electric tool. When the spindle 14 has ceased its driving rotation, the larger-diameter end of the torsion spring 18 firmly engages with the bushing 17. Then the energy stored in the torsion spring 18 causes the cluth element 15 to rotate into the direction opposite to its driving until the notch 25 on the clutch element engages with the pawl 22. When the pawl 22 has engaged with the notch 25, the device is ready for next stripping and wrapping operation of a covered fresh wire.

The bore 26 is flared its inlet 36 as shown. This flared inlet 36 serves to coil the wire with intimate turns to the end on the terminal 27. As shown in FIG. 5, the forward end of the spindle 14 is chamferred at 37. This chamferred part is slightly biased into a direction opposite to the driving rotation of the spindle so that the wire withdrawing from the groove 28 will not be subjected to undesirable stress during the wrapping on the terminal.

I claim:

1. A device for automatically stripping the cover of a covered wire and wrapping the uncovered wire on a terminal comprising a sleeve having at the rear end thereof means for fixedly securing to a suitable power tool, a slot opening formed through the wall of said sleeve near said rear end, a spindle rotatably mounted in said sleeve and connected at the rear end thereof to the output shaft of said power tool and having at the forward end thereof a bore for loosely receiving a terminal, an axial groove formed on said spindle and extending from said forward end of the spindle to said slot opening of the sleeve, the forward end of said groove being defined by a knife edge, and means for positioning the spindle relative to the sleeve where said groove aligns with said slot opening, and said forward end of said sleeve having at least one notch for engagement with the wire.

2. A device for automatically stripping the cover of a covered wire and wrapping the uncovered wire on a terminal as claimed in claim 1, in which a radially inwardly projected knife edge is formed at the forward end portion of the sleeve.

3. A device for stripping the cover of a covered wire and wrapping the uncovered wire on a terminal as claimed in claim 1, in which a part of the forward end portion of the sleeve is buldged to form a space for readily inserting the wire into said groove when the groove is aligned with the slot opening.

* * * * *